UNITED STATES PATENT OFFICE.

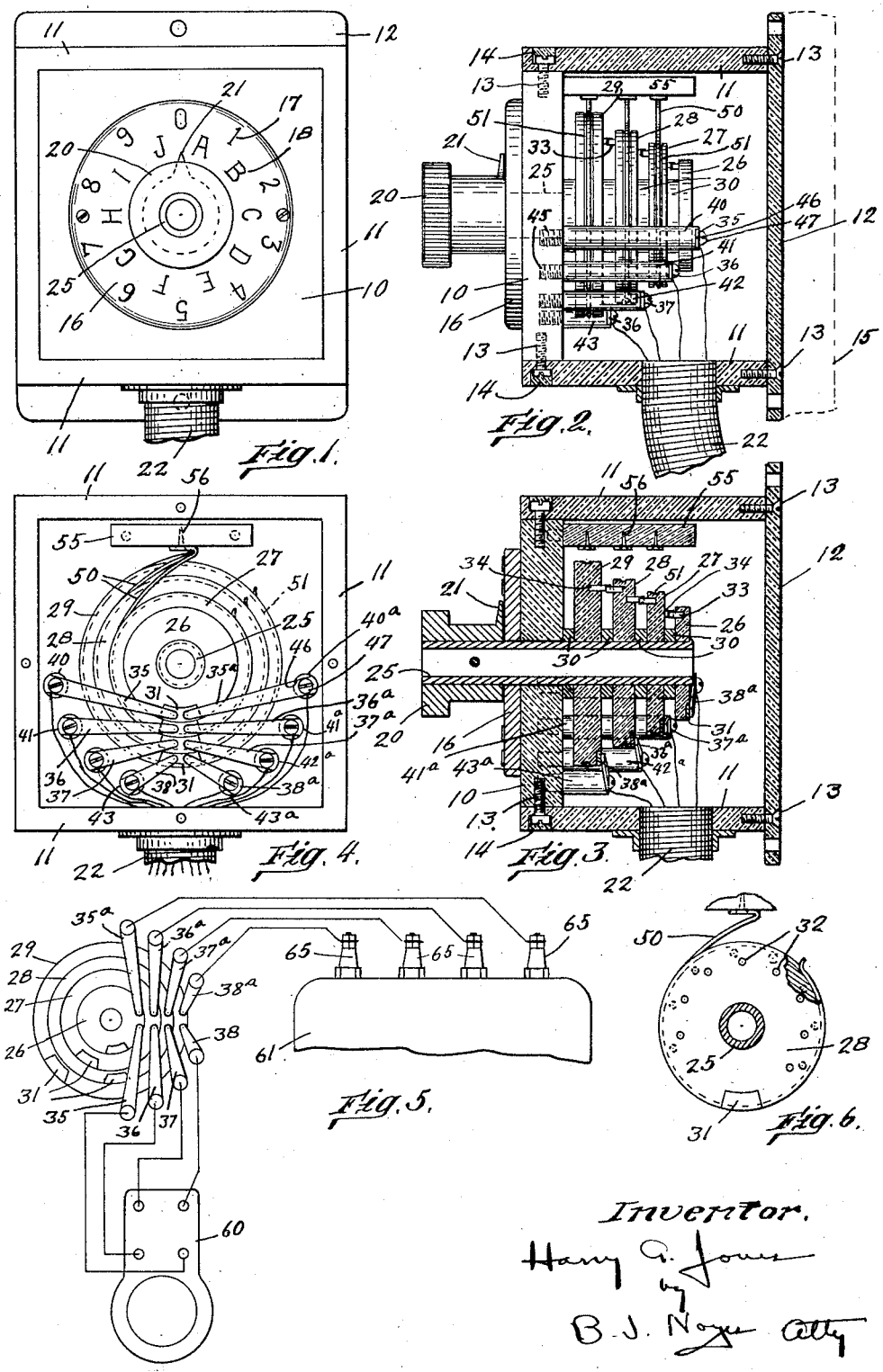

HARRY A. JONES, OF BOSTON, MASSACHUSETTS.

COMBINATION ELECTRIC SWITCH.

1,340,230.   Specification of Letters Patent.   Patented May 18, 1920.

Application filed April 10, 1919. Serial No. 289,017.

*To all whom it may concern:*

Be it known that I, HARRY A. JONES, a citizen of the United States, and a resident of Boston, in the county of Suffolk and State of Massachusetts, have invented an Improvement in Combination Electric Switches, of which the following is a specification.

My invention relates to a combination electric switch for the control of the ignition circuits of the engine of an automobile and arranged to render difficult the proper control of the circuits by one having no knowledge of the proper method of operation of the switch control member, or the combination of the switch, whereby unauthorized use of the automobile is rendered difficult.

An object of my invention is the provision, in a switch of the type above described, of circuit-controlling members so arranged that the operative condition thereof may be made known by inspection, which inspection may be made without disassembling the switch components.

A further object of my invention is the provision of a switch of the type set forth of simple design and of few components whereby it may be relatively cheaply manufactured.

Figure 1 is a front view of the combination switch embodying my invention.

Fig. 2 is a side view of the device of Fig. 1 with a side plate removed.

Fig. 3 is a vertical section of the device illustrating the switch elements.

Fig. 4 is an end view of the switch with the back plate removed and illustrating the stepped relation of the circuit-control disks and contact members.

Fig. 5 is a diagrammatic view illustrating the relation of the circuit-controlled members of the switch to the secondary or ignition circuit of the engine of an automobile.

Fig. 6 is a plan detail of a circuit control disk.

As here shown the casing comprises a front plate 10, top, bottom and side plates 11 and a removable back plate 12, secured together in box form by screws 13 to inclose the switch components, which screws are concealed by the plugs 14.

The back plate 12 extends beyond the top and bottom plates 11 adapting it to be secured to the face of a dash-board 15 or other suitable part of the automobile by screws or other fastening means passing through such extended portions. The front plate 10 supports the switch elements and as here shown it has secured to it a dial plate 16 which may have an outer series of numbers, as 17, and an inner series of letters, as 18, concentrically and alternately arranged from which the combination of the switch is formed, as is usual practice.

An operating knob 20 extends beyond said dial and may bear an indicator or pointer 21 which is movable over said dail by said knob to indicate the position of the circuit control disks of the switch relative to the circuit contact-members, whereby the proper manipulation of the knob or handle 20 in accordance with a predetermined combination may cause the circuit control disks to be moved into correct circuit controlling position.

A flexible conduit 22 may extend from the bottom plate which incloses the ignition leads which are extended from the switch to the proper components of the ignition circuits.

An operating shaft, comprising a tube 25, extends through and is journaled in the plate 10 and the outer end of said shaft has secured to it the handle or knob 20 by means of which it may be manually rotated. The inner end of said shaft extends within the switch casing and the several circuit control disks are arranged upon it.

Four circuit control disks are here shown, as, 26, 27, 28 and 29, all of which are similar in construction, and as many disks will be employed as there are circuits to be controlled. For a four cylinder engine, for instance, there are four circuits to be controlled, hence four are employed, one for each cylinder, and for an eight cylinder engine eight disks will be employed, and so on. Each of said disks except the outermost disk 26 is loosely arranged on said shaft 25 but said disk 26 is rigidly secured thereto. The several disks are separated from adjacent disks by the spacing-washers 30.

Each circuit control disk is formed of insulating material, as hard rubber, and has embedded therein a conducting-segment 31 of relatively small peripheral extent as compared with the peripheral length of the disk. The top surface of said segment is substantially flush with the top surface of the disk so that as the segment is moved beneath the circuit contact-members there will be no perceptible change in resistance offered to the rotation of the disk, nor will there be any noise made, which would serve to indicate the combination of the device.

A plurality of holes or recesses 32, as many as there are numbers and letters on the dial 16, are formed in the flat sides of the circuit control disks and a pin 33 is adapted to be frictionally held in any one of said holes or recesses which forms a driving means between two adjacent disks. The pin extended from one disk is adapted to engage with a pin extended from an adjacent disk whereby upon the rotation of the first disk the two pins will be moved into engagement and upon further rotation of the first disk both will be rotated. However, upon the rotation of the first disk in the reverse direction, the second disk will obviously not be driven and will consequently remain in the position to which it has been moved until the first disk has been rotated in the reverse direction practically an entire revolution.

While the end disk 26 need be provided with but one pin, as 33, it is necessary to provide the intermediate disks, as 27 and 28, with two pins which extend from opposite sides or faces of the disks. Therefore a pin 34, for instance, which is adapted to be engaged by the pin 33, may be fixed in said disk 27. The pin 33 may be placed in any one of the recesses 32 and the combination of the device will thereby be changed, or said pin 34 may be positioned on any one of a number of recesses in said disk 27 and the combination of the device will also be changed.

Sets of coöperating spring or contact members as 35, and 35ᵃ, 36 and 36ᵃ, 37 and 37ᵃ, 38 and 38ᵃ are provided for each disk and are adapted to be in continual engagement with the surfaces of said disks and when the segments 31 are moved therebeneath to be bridged and hence to be electrically connected. Said contact members 35, 36, 37 and 38 are secured to the ends of upright posts 40, 41, 42 and 43 and said contact members 35ᵃ, 36ᵃ, 37ᵃ and 38ᵃ are secured to the upright posts 40ᵃ, 41ᵃ, 42ᵃ and 43ᵃ. Said posts have reduced and threaded terminal portions 45 which are threaded in the back of the front supporting plate 10 and thereby rigidly secured thereto although other suitable post-securing means may be provided. Each post 40 may have a slotted or recessed end portion as 46 in which the end of its contact-member is received and said contact-member may be secured thereto by the binding screw 47. Said binding screw 47 may also serve to clamp a circuit-lead in electrical engagement with said contact-members.

Said circuit control disks, 26, 27, 28 and 29 are formed of different diameters and arranged in stepped relation on the shaft 25, with the disk of smallest diameter, as 26, at the inner end and the disk of largest diameter, as 29, at the outer end of the series. Each disk is made so much greater in diameter than the adjacent disk on its inner side that the conducting-segment 31 embedded therein is located practically entirely beyond said adjacent disk and the ends of the contact-members as 36, 36ᵃ, etc., occupy positions practically entirely beyond the periphery of said adjacent disks. By this arrangement the condition of the contacting surface of the contact-members and conducting-segments 31 may be observed at a glance upon the removal of the back plate 12 and without disturbing or disassembling the switch components. The contact-member supporting-posts, as 40, 41, 42 and 43 are graduated in length in a manner similar to the construction of the circuit-controlled disks, with the similar longest posts spaced the farthest apart and adapted to support the contact-members for the smallest disk and the shortest posts as 43 the nearest together and adapted to support the contact-members for the largest disk. Said supporting-posts are preferably arranged concentric with the circuit control disks as is shown more clearly in Fig. 4 whereby a compact arrangement of posts and other components is obtained.

The above-described arrangement results in a very neat disposition of the component parts of the device and permits instant inspection of the circuit control-members and their facile adjustment. The binding screws 47 are readily accessible to secure circuit-leads thereto and without interference from other leads or parts of the switch.

It is necessary that while each circuit-control disk shall be readily movable whereby it may be adjusted for the control of its individual ignition or secondary circuit, yet it must be held against unintentional movement during further adjustment of the switch to pick up the other disks and move them into circuit control position.

For this purpose, means are provided whereby the disks are frictionally held in any adjusted position. The friction-members for the disks comprise resilient bands 50 bent into circular form and received in grooves 51 in the peripheries of the circuit-control disks and adapted to snugly engage and hold them in adjusted position. A friction member is provided for each disk except the end disk, the friction of the shaft to which it is secured in its bearing rendering a friction-member unnecessary. The end of each friction-member is reflexed and each is separately secured to a supporting board 55 by screws 56 or other means.

In Fig. 5 there is illustrated the connection between the magneto 60 and the spark plugs 65 of the cylinders of the engine 61, whereby each disk serves to independently control an ignition or secondary circuit of the magneto.

I claim:—

1. A combination electric switch comprising an operating shaft, a series of circuit control disks formed of insulating material and of different diameters arranged in graduated relation on said shaft with the disks of greatest differing diameters at the ends of the series, whereby each disk of the series has a peripheral portion extended beyond the periphery of the adjacent smaller disk of the series, conducting segments carried by said disks on similar faces of such extended portions thereof, contact members in engagement with the extended peripheral portions of said disks, adapted to engage said segments and means to drive said disks from said operating shaft.

2. A combination electric switch comprising an inclosing casing having a front-plate and a removable back plate, an operating shaft supported by said front plate, a series of circuit control disks of different diameters arranged in graduated relation thereon and with the disks of greatest differing diameters at the ends of the series, whereby a larger disk of the series has a peripheral portion extended beyond the periphery of the adjacent smaller disk of the series, said disks having conducting portions at the extended peripheral portions thereof, circuit contact members in engagement with said extended peripheral portions of said disks, and means to drive said disks by said shaft.

3. A combination electric switch comprising an operating shaft, a series of circuit control disks of insulating material and of different diameters arranged in graduated relation on said shaft with the disk of largest diameter at the inner end and the disk of least diameter at the outer end of the series, whereby the larger disks of the series have peripheral face portions extended beyond the peripheries of adjacent smaller disks of the series, conducting segments carried by the outer faces of said disks at the peripheral portions thereof, a pair of spaced apart circuit contact members in engagement with said outer peripheral face portions of each of said disks and extended on diametrically opposite sides of the disks for engagement with said segments, and means to drive said disks by said operating shaft.

4. A combination electric switch comprising an inclosing casing having a front plate and a removable back plate, an operating shaft supported by said front-plate, a series of circuit control disks of insulating material and of different diameters arranged in graduated relation on said shaft with the disk of largest diameter at the inner end and the disk of least diameter at the outer end of the series, whereby the larger disks of the series have peripheral face portions extended beyond the peripheries of adjacent smaller disks of the series, conducting segments carried by the outer faces of said disks at the peripheral portions thereof, a pair of spaced-apart circuit contact members in engagement with said outer peripheral face portions of each of said disks for engagement with said segments, the contact members of each pair extended on diametrically opposite sides of said disks, a supporting post for each contact member, said posts arranged on opposite sides of said disks and means to drive said disks by said operating shaft.

5. A combination electric switch comprising a supporting plate, an operating shaft supported thereby and extended therethrough, a series of circuit control disks arranged on said shaft above said supporting plate, conducting segments arranged on the periphery of said disks, means to drive said disks by said shaft, a plurality of circuit contact members in engagement with said disks, adapted to be electrically connected by said conducting segments and a plurality of contact member supporting posts each independently carried by said supporting plate and extended outwardly therefrom, and means to secure said contact members to said posts, said supporting plate thereby forming the supporting means for the switch components.

6. A combination electric switch comprising a supporting plate, an operating shaft supported thereby and extended thereabove, a series of circuit control disks of different diameters arranged on said shaft in graduated relation, with the largest disk at the inner end and the smallest disk at the outer end of the series, conducting segments arranged on the periphery of said disks, circuit contact members in engagement with said disks adapted to be electrically connected by said conducting segments, a series of contact member supporting posts carried by said supporting plate and extended thereabove to different lengths and arranged in graduated rows whereby the largest posts are adapted to support the contact members for the disk of least diameter, and the shortest posts are adapted to support the contact members for the disk of greatest diameter, means to secure said contact members to said posts, and means to drive said disks by said operating shaft.

7. A combination electric switch comprising an inclosing casing having a front plate and a removable back plate, an operating shaft extended through said front plate and rotatable therein, a series of circuit control disks of different diameters, conducting segments arranged on similar peripheral faces of said disks, said disks arranged in graduated relation on said shaft with the disk of greatest diameter at the inner end and the disk of least diameter at the outer end of the series, whereby the conducting segments extend beyond the peripheries of adjacent outer and smaller disks of the series, a pair of circuit contact members in engagement with the extended peripheral outer face portion of each disk adapted to be electrically connected by said conducting segments, the contact members of each pair extended on diametrically opposite sides of the disks, contact member supporting posts of different lengths carried by and extended from said supporting plate and arranged in graduated relation in rows whereby the largest post is adapted to support a contact member for the disk of least diameter, and the shortest post is adapted to support the contact member for the disk of greatest diameter, and means to secure said contact members to said posts.

In testimony whereof I have signed my name to this specification in the presence of two subscribing witnesses.

HARRY A. JONES.

Witnesses:
 ELIZABETH M. HANSON,
 AMOS L. TAYLOR.